United States Patent
Hale et al.

[11] 3,913,693
[45] Oct. 21, 1975

[54] SNOWMOBILE DRIVE SUSPENSION SYSTEM

[75] Inventors: Gordon B. Hale, Waukegan; Richard A. Wlezien, Antioch, both of Ill.

[73] Assignee: Outboard Marine Corporation, Waukegan, Ill.

[22] Filed: May 18, 1973

[21] Appl. No.: 361,468

Related U.S. Application Data

[63] Continuation of Ser. No. 126,416, March 22, 1971, abandoned.

[52] U.S. Cl. ................................. 180/5 R; 305/28
[51] Int. Cl.² ........................................ B62M 27/00
[58] Field of Search ........... 180/5 R, 9.5, 9.54, 9.52; 305/24, 25, 27, 28

[56] References Cited
UNITED STATES PATENTS

| | | | |
|---|---|---|---|
| 3,068,950 | 12/1962 | Davidson | 280/5.22 X |
| 3,485,312 | 12/1969 | Swenson | 180/5 R |
| 3,613,810 | 10/1971 | Hetteen | 180/5 R |
| 3,613,811 | 10/1971 | Brandli | 180/5 R |
| 3,719,242 | 3/1973 | Duclo | 180/5 R |
| 3,761,143 | 9/1973 | Russ | 305/28 |

*Primary Examiner*—Philip Goodman
*Assistant Examiner*—John A. Carroll
*Attorney, Agent, or Firm*—Michael, Best & Friedrich

[57] ABSTRACT

Disclosed herein is a snowmobile including a track supporting frame comprising a carriage rotatably mounting a plurality of bogies on fixed axes adjacent the forward and rearward carriage ends, a track which is trained around the bogies and around a forwardly located drive sprocket rotatably mounted on a chassis, and forward and rearward parallel links pivotally connecting the carriage to the chassis with the links having a length and being mounted on the chassis in such manner relative to the chassis and the carriage that the tension in the track is substantially the same, notwithstanding movement of the carriage between an extended, normal running position and a retracted, or partially collapsed position.

13 Claims, 10 Drawing Figures

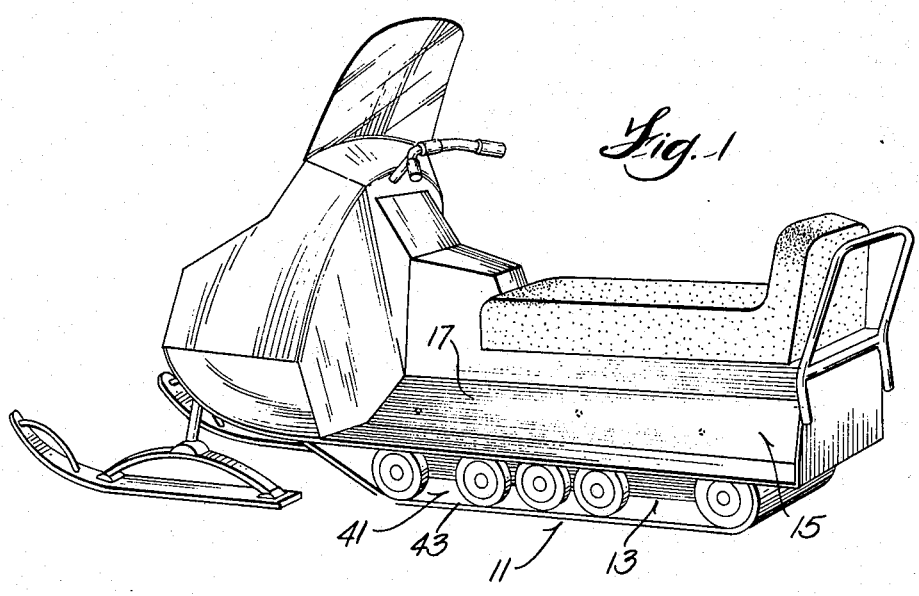
Fig. 1
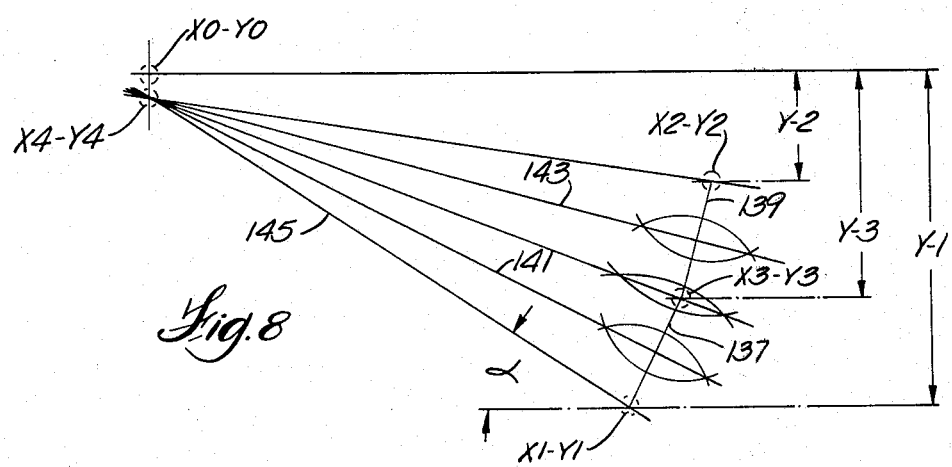
Fig. 8
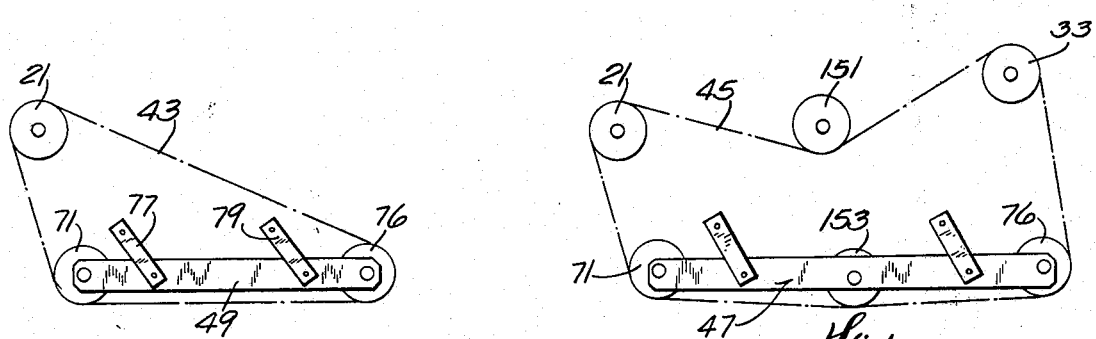
Fig. 9
Fig. 10
Inventors
Gordon B. Hale
Richard A. Wlezien
By Robert E. Clancy
Attorney Inventors
Gordon B. Hale
Richard A. Wlezien
By Robert E. Clemency
Attorney

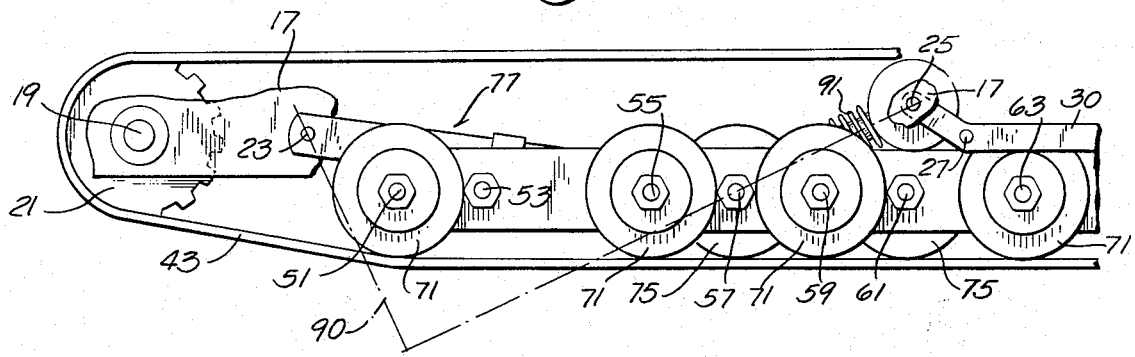
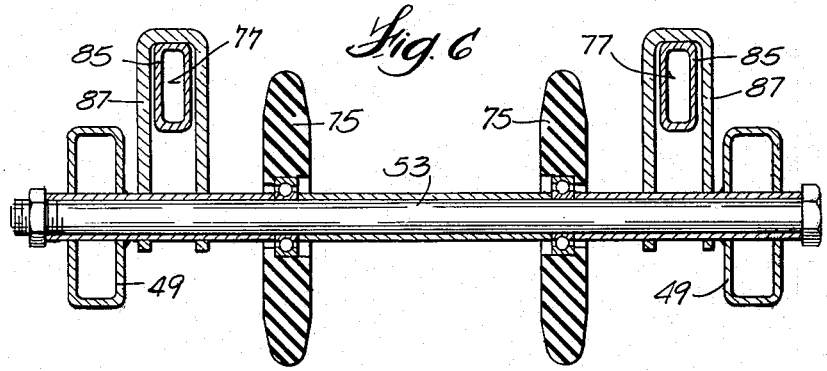

ન્યૂ3,913,693

SNOWMOBILE DRIVE SUSPENSION SYSTEM

This is a continuation of application Ser. No. 126,416 filed Mar. 22, 1971, now abandoned.

BACKGROUND OF THE INVENTION

The invention relates generally to snowmobiles and other similar track vehicles. More particularly, the invention relates to arrangements for supporting a drive track or belt in such manner as to afford an efficient drive to the track, notwithstanding travel over rough ground. In this regard, because of the rough terrain over which snowmobiles commonly travel, track suspensions have generally been made resilient to soften the shock when the snowmobile encounters moguls or bumps. Such resiliency of the track suspension system has commonly resulted in loss of proper tension in the belt incident to yielding movement of the suspension system from the normal operating position. In the past, various arrangements have been employed in an attempt to provide proper tension.

Loss of tension in the track results in decreased power transmission from the drive sprocket to the belt and consequent decrease in speed.

Examples of prior track suspensions are included in the U.S. Trapp Pat. No. 3,446,303 issued May 27, 1969, and in the U.S. Swenson et al Pat. No. 3,485,312 issued Dec. 23, 1969.

SUMMARY OF THE INVENTION

The invention provides a track suspension for a snowmobile or other track vehicle including a bogie supporting carriage or frame which rotatably supports a plurality of bogies on axes fixed relative to the carriage and which is carried for resilient movement from a normal running position by a linkage which serves to maintain the track tension substantially uniform, notwithstanding carriage movement from the normal running position.

More specifically, the invention provides a track suspension system involving a bogie supporting frame which is mounted by a pair of parallel links and which, accordingly, forms one part of a parallel linkage. Also in accordance with the invention, the supporting parallel links are dimensioned and are arranged relative to the bogie supporting frame such that belt tension is maintained substantially constant, notwithstanding movement from the running position and without the use of idler bogies movable relative to the frame for the purpose of accommodating variation in track tension.

The invention also provides a track suspension system capable of being employed with bogies of various diameters and with various track configurations. Specifically, a parallel linkage track suspension assembly in accordance with the invention can be employed to support a track trained in a generally triangular configuration around a drive sprocket and around forward and rearward bogies mounted on the suspension assembly for rotation about fixed axes, to support a track extending in a generally parallelogram arrangement with lower forward and rearward bogies supported by the track suspension assembly for rotation about fixed axes, or to support tracks trained in other configurations around a drive sprocket on the chassis and around forward and rearward bogies rotatably mounted on axles fixed relative to the track suspension assembly.

The invention also provides a track supporting assembly which simultaneously moves rearwardly and toward a frame or chassis in response to violent ground engagement.

The invention also provides a track suspension assembly which, in response to violent ground engagement, will move toward the frame from a normal running position and which initially offers increasing resistance to movement from the running position and which will thereafter offer decreasing resistance.

The invention also provides for energy absorbing means operable in response to movement of the track suspension assembly.

One of the principal objects of the invention is the provision of a new and improved track suspension arrangement for a snowmobile or other like vehicle.

Another of the principal objects of the invention is the provision of a track suspension assembly which moves rearwardly and upwardly toward the frame or chassis of a snowmobile consequent to violent engagement with the ground.

Another of the principal objects of the invention is the provision of a track suspension system including a parallel linkage arranged to maintain substantially uniform tension in the track or belt, notwithstanding yieldable movement of the track supporting linkage and without the aid of idler bogies mounted for movement relative to the track suspension assembly.

Another of the principal objects of the invention is the provision of a track suspension assembly which has superior yieldability characteristics and shock absorbing characteristics.

Another object of the invention is the provision of a snowmobile track suspension arrangement which is relatively easy and economical to manufacture and which will provide reliable operation over a long and useful life.

Other objects and advantages will become known by reference to the following description and accompanying drawings.

DRAWINGS

FIG. 1 is a perspective view of a snowmobile embodying various of the features of the invention.

FIG. 5 is a partially broken away, fragmentary elevational view, of the track suspension assembly shown in FIG. 5, with the assembly shown in its retracted or collapsed condition.

FIG. 6 is an enlarged sectional view taken generally along line 6—6 of FIG. 3.

FIG. 7 is an enlarged sectional view taken generally along line 7—7 of FIG. 3.

FIG. 8 is a diagram illustrating the manner of determining the location and arrangement of the parallel links embodied in the track suspension assembly incorporated in the snowmobile shown in FIG. 1.

FIG. 9 is a schematic view of another embodiment of the invention.

FIG. 10 is a schematic view of still another embodiment of the invention.

GENERAL DESCRIPTION

Figure 2:
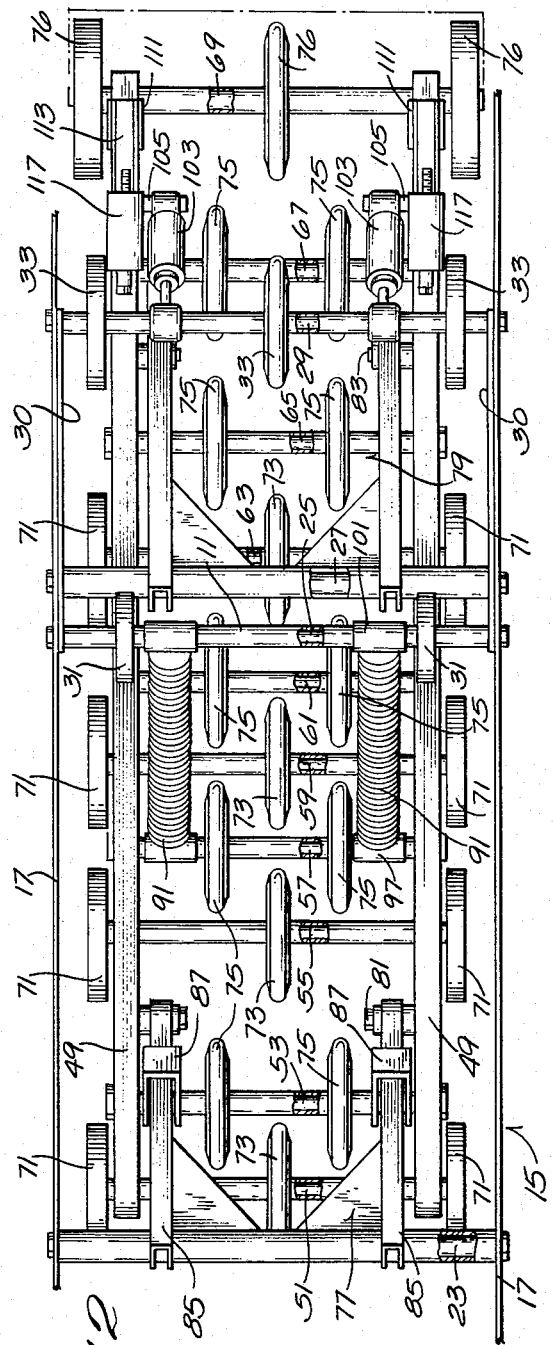
FIG. 2 is an enlarged fragmentary top plan view, with portions removed, of the snowmobile shown in FIG. 1 and illustrating the track suspension assembly incorporated therein.

The drawings are illustrative of a snowmobile 11 embodying a track suspension 13 in accordance with the invention. More particularly, the snowmobile 11 comprises a frame or chassis 15 which includes a downwardly open U-shaped portion including spaced side walls 17. Extending through at least one of the side walls 17 is a drive shaft 19 which is drivingly connected to the engine (not shown) and which supports a track driving sprocket 21 which can be constructed as shown, for instance, in FIGS. 1, 2, and 3 of the Irgens U.S. Pat. No. 3,472,563 issued Oct. 14, 1969. Extending between the side walls 17 are four cross bars 23, 25, 27, and 29. Connecting the adjacent ends of the cross bars 25, 27, and 29 are transversely spaced straps 30 which reinforce the frame side walls 17.

The forwardly located intermediate cross bar 25 carries two transversely spaced idler rollers 31 and the rearwardmost cross bar 29 rotatably supports three transversely spaced bogies or bogie wheels 33.

Also carried by the chassis 15 is a track suspension assembly 41 which is constructed and mounted relative to the chassis 15 in accordance with the invention and which, together with the drive sprocket 21 and the before mentioned idler rollers 31 and bogie wheels 33, supports a track or belt 43 which can be constructed in various ways. In the disclosed construction, the track 43 includes, on the inside surface thereof, a series of lugs arranged in the manner shown generally in FIG. 5 of the Irgens U.S. Pat. No. 3,472,563 issued Oct. 14, 1969.

The track suspension assembly 41 is resiliently biased to a normal running or extended position projecting from the chassis 15 and is swingably movable relative to the normal running position to a retracted position located rearwardly of the running position and in more closely adjacent relation to the chassis whereby, in cooperation with the compression spings still to be described, to afford resilient action in response to shocks occurring incident to travel over rough terrain. The track suspension assembly 41 is further designed so as to afford such movement while maintaining a substantially uniform tension in the track.

More particularly, the track suspension assembly 41 comprises a track supporting frame including a carriage 47 formed by two transversely spaced tie bars 49 which are fixed relative to each other by a plurality of transverse members which also supports a plurality of bogie wheels. In the specifically disclosed construction shown in FIG. 2, there are nine such transverse members 51, 53, 55, 57, 59, 61, 63, 65, and 67, plus an additional rear axle 69. The first, third, fifth, and seventh transverse members 51, 55, 59, and 63 each rotatably support left and right bogie wheels 71 outside of the tie bars 49, as well as a third bogie wheel 73 located centrally between the tie bars 49. The arrangement of bogie wheels 33 on the before mentioned rearwardmost chassis cross bar 29 is the same as on the first, third, fifth, and seventh transverse members 51, 55, 59, and 63. The second, fourth, sixth, eighth and ninth transverse members 53, 57, 61, 65, and 67 each rotatably support a transversely spaced pair of bogie wheels 75 located between the tie bars 49. The rear axle 69 supports bogie wheels 76 arranged in the same manner as on the first, third, fifth, and seventh transverse members 51, 55, 59, and 63. The bogie wheels 71, 73, 75, and 76 are all rotatably mounted on axes fixed relative to the carriage 47, except that the bogie wheels 76 mounted on the rear axle 69 are adjustably fixed as will be later described.

The carriage 47 is connected to the chassis 15 (See FIGS. 2 and 3) so as to afford swinging movement between an extended running position and a retracted position by a pair of forwardly and rearwardly spaced links 77 and 79 which are respectively pivotally connected to the first and third chassis cross bars 23 and 27 and to studs 81 and 83 on the tie bars 49 of the carriage 47 to provide a parallel linkage affording carriage movement rearwardly and toward the chassis from the extended running position to the retracted position. As will be explained hereinafter in greater detail, the links 77 and 79 are dimensioned and arranged relative to the chassis 15 and the carriage 47 so that a generally uniform tension is provided in the track or belt 43 during movement between the running and retracted positions.

Means are provided for limiting movement of the carriage 47 away from the chassis 15 to establish the normal running position with the links 77 and 79 extending forwardly and upwardly from the carriage 47 at a predetermined angle.

Figure 3:
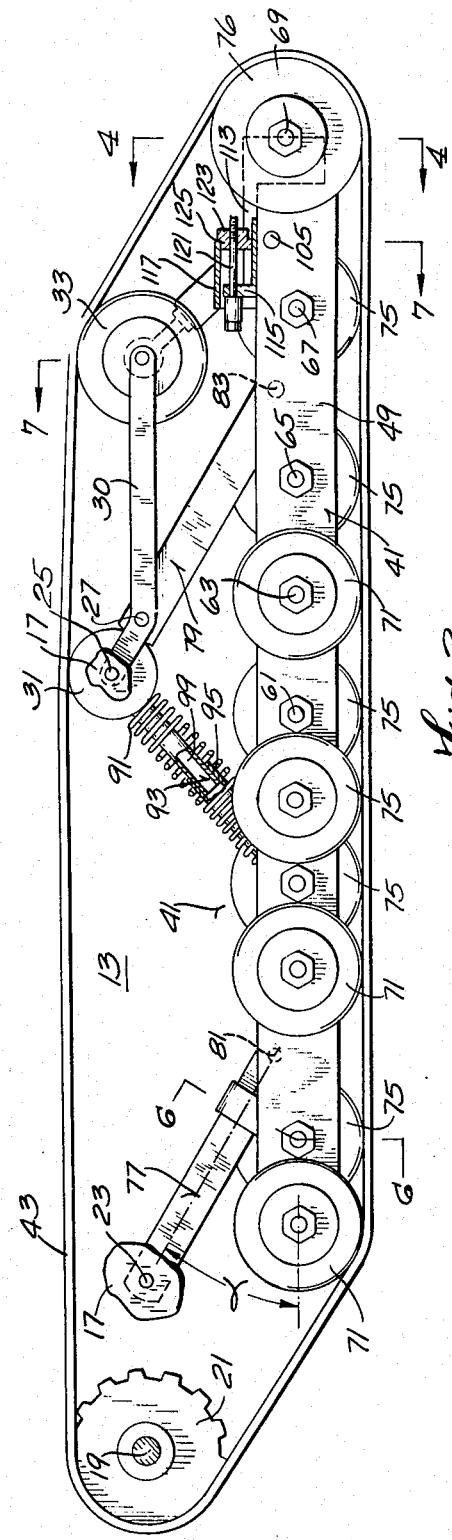
FIG. 3 is an enlarged side elevational view, partially broken away and in section, of the track suspension assembly shown in FIG. 2, with the track suspension assembly shown in its extended normal running condition.

While various other constructions can be employed, in the disclosed construction, as shown in FIGS. 3 and 6, the forward link 77 specifically comprises two transversely spaced and rigidly connecting members 85 which are pivoted to the tie bars 49 on the studs 81 which are located between the second and third transverse members 53 and 55. Located forwardly of the studs 81 and extending pivotally from the second transverse member 53 are two U-shaped stop links 87 which respectively capture the link members 85 to limit forward and outward swinging movement of the carriage 47 relative to the chassis 15 and to thereby establish the normal running position.

Means are provided for limiting swinging movement of the carriage rearwardly and toward the chassis 15 to establish the retracted or collapsed position. While other arrangements can be employed, in the disclosed construction (See FIG. 2), the idler rollers 31 are transversely spaced on the chassis cross bar 25 so as to engage the transversely spaced tie bars 49 as the carriage 47 moves toward the chassis 15 to thereby determine the retracted position.

Means are provided for resiliently biasing the carriage 47 toward the extended normal running position determined by the stop links 87. Various arrangements can be employed including torsion springs mounted at the pivot points, or tension springs connected between points which move apart during movement of the carriage 47 from the running position, or compression springs connected between points which move closer together during movement of the carriage 47 from the running position. In the disclosed construction, such means comprises a pair of transversely spaced helical compression springs 91 arranged in encircling relation around respective transversely spaced telescopic sleeve assemblies 93. More specifically, each sleeve assembly 93 comprises a lower or outer sleeve 95 which, at its lower end, is pivotally connected to the fourth transverse member 57 and is provided with a seat 97 for the lower end of the associated compression spring 91.

Each sleeve assembly 93 also includes an upper or inner sleeve 99 which is telescopically received in the outer or lower sleeve 95 and which, at its upper end, is pivotally connected to the second chassis cross bar 25 and thereby to the frame or chassis 15. In addition, the upper end of each of the inner sleeves 99 includes an upper seat 101 for the associated compression spring 91. As a consequence, the carriage 47 is yieldably urged to the extended running position while movement from the extended running position to the retracted position against the bias of the compression springs 91 is permitted.

Means are also provided for damping movement of the carriage 47 relative to the extended running position. While other arrangements can be employed, in the disclosed construction, the rearwardmost chassis cross bar 29 has (See FIG. 7) pivotally connected thereto a pair of transversely spaced shock absorbers 103 which, at their lower ends, are respectively pivotally connected to studs 105 extending from the spaced tie bars 49 between the ninth cross member 67 and the rear axle 69.

When the carriage 47 is in the normal running position, the shock absorbers 103 are substantially extended, while in the retracted carriage position, the shock absorbers 103 are almost fully contracted. As a consequence of the above disclosed construction, during movement of the carriage 47 rearwardly and toward the chassis, the shock absorbers 103 contract and absorb or remove energy. During return movement of the carriage 47 toward the running position, the shock absorbers 103 expand, removing energy and offering resistance during movement from the running position, i.e., during movement rearwardly and toward the chassis.

Figure 4:
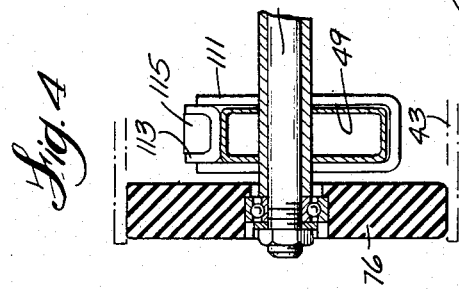
FIG. 4 is an enlarged fragmentary sectional view taken generally along line 4—4 of FIG. 3.

Means are provided for facilitating initial training of the belt or track 43 around the bogie wheels 33, 71, 73, 75, and 76, the idler rollers 33, and the drive sprocket 19 and for initially setting a desired amount of tension in the track 43 when the carriage 47 is in the normal operating or running position. While various arrangements can be employed (See FIGS. 2, 3, and 4), in the disclosed construction, such means comprises association, with each of the tie bars 49, of a sleeve bracket 111 which is telescopically received over the rear end of the associated tie bar 49 and which rotatably supports one end of the rear axle 69. Each bracket 111 includes an extending arm 113 which projects forwardly along the top of the associated tie bar 49 and includes at the forward end thereof an upstanding ear 115. Enclosing each ear 115 on the associated tie bar 49 is an inverted U-shaped sleeve 117 which is welded to the top of the associated tie bar 49 and which is open at both the forward and rearward ends.

Movement of the brackets 111 relative to the tie bars 49 to adjustably locate the rear axle 69 is accomplished by the use of respective bolts or screws 121 which, except for abutment of the head of the bolt 121 with the forward surface of the associated upstanding ear 115, freely passes through apertures in the ears 115 and are threaded into respective nuts or clamp members 123 which abut the rearward end of the sleeves 117 and have portions 125 extending into the sleeves 117 and engaging the inner walls of the sleeves 117 to prevent rotation of the nuts or clamp members 123 relative to the sleeves 117. Accordingly, threading of the bolts 121 into the clamp members or nuts 123 causes the ears 115 and attached axle supporting brackets 111 to be moved rearwardly so as to increase the tension in the belt 43.

During assembly of the belt 43 around the track suspension assembly 41, the adjustment means is manipulated to permit the rear axle supporting brackets 111 to move forwardly to facilitate assembly of the track 43 around the suspension assembly 41. After the belt or track 43 is in place, the rear axle supporting brackets 111 are then displaced rearwardly by manipulation of the screws 121 to place the belt 43 under proper tension.

The disclosed spring arrangement for yieldably biasing the carriage 47 toward the extended running position is particularly advantageous as the springs 91 initially offer increasing resistance to movement toward the retracted position and thereafter offer decreasing resistance. In this regard, it is noted that resistance to swinging movement of the parallel linkage about the chassis cross bars 23 and 27 is a torque which is the product of the spring force times the lever or moment arm to the line of action of the spring from the cross bar 25. In the disclosed construction, although the spring force is ever increasing as the springs 91 are compressed in response to carriage movement rearwardly and toward the chassis 15, the lever or moment arm 90 through which the springs act, is decreased as the springs 91 contract. (Compare FIGS. 3 and 5). The geometry is such that during initial movement from the extended running position, the increase in spring force has an initially greater effect than the decreasing moment arm and the carriage 47 experiences increasing resistance to movement from the running position. However, as the carriage 47 continues to move toward the retracted position, the effect of the decrease in moment arm becomes more pronounced than the increasing spring force, with the result that the resulting resisting torque subsequently decreases.

As noted earlier, the links are dimensioned, taking into account the radius and location of the rearward bogies 76 so as to minimize any variation in track tension during movement of the carriage 47 between the running or extended position and the retracted position. More specifically, the links 77 and 79 are dimensioned and located relative to the chassis 15 and the carriage 47 so that there are three positions of equal belt tension, one being at the running position, another at the retracted position, and another being intermediate the running and retracted positions of the track suspension assembly. Intermediate these three positions, the tension in the belt or track 43 varies only slightly and for practical purposes can be considered uniform.

Referring to FIG. 3, the length of the links 77 and 79 and the mounting arrangement thereof relative to the chassis 15 and carriage 47 can be determined after initial determination of the length of the belt 43, the location on the chassis 15 and the diameter of the drive sprocket 21 and upper rear bogie wheels 33, and the diameter and location on the carriage 47 of the bogie wheels 71 and 73 on the first transverse member 51 when the carriage 47 is in the extended position. More specifically and referring to FIG. 8, at the outset, coordinates X0–Y0 are arbitrarily applied to the axis of the rear upper bogie wheels 33.

Ordinates X1–Y1 are then applied to the axis of the lower rearwardmost bogie wheels 76 carried by the rear axle 69. From the given information, the Y1 ordinate is known, i.e., the vertical distance from the axis of the rear upper bogie wheels 33 to the axis of the rear lower bogie wheels 76. The X1 ordinate can then be readily mathematically computed assuming the diameter of the lower rear bogie wheels is known.

Arbitrarily applying the ordinates X2–Y2 to the location of the axis of the lower rear bogie wheels 76 when the carriage 47 is in the retracted position and knowing the ordinate Y2, it is possible to mathematically calculate the ordinate X2.

A third location of the carriage 47 intermediate the extended and retracted positions (preferably half-way between) is then chosen and the ordinates X3–Y3 are arbitrarily applied. As Y3 is known (half-way between Y1 and Y2), X3 can then be obtained by calculation.

Lines 137 and 139 are then drawn respectively joining X1–Y1 to X3–Y3 and X2–Y2 to X3–Y3. The lines 137 and 139 are then each perpendicularly bisected by respective lines 141 and 143 and the intersection of such bisecting lines 141 and 143 constitutes a center which is arbitrarily assigned ordinates X4–Y4 and which is equidistant from X1–Y1, X2–Y2, and X3–Y3. The length of a line 145 from X4–Y4 to X1–Y1 (or to X2–Y2 or to X3–Y3) is the length from center to center of the links 77 and 79 while the angle $\alpha$ between the line 145 connecting X4–Y4 and X1–Y1 and the horizontal is the angle between the links 77 and 79 and the horizontally extending carriage 47 when the carriage is in the extended or normally running position.

When parallel links 77 and 79 of the length calculated in the manner just described are connected between the carriage 47 and the chassis 15 with the stop links 87 arranged and dimensioned such that the links 77 and 79 are at the angle $\alpha$ to the carriage when the carriage 47 is in the extended running position, the carriage 47 is swingably movable in such manner that the lower rear bogie wheels 76 will maintain a substantially uniform tension in the track or belt 43, notwithstanding movement relative to the running position, and thereby afford more efficient power delivery from the drive sprocket 21 to the belt 43.

A track suspension assembly 41 arranged in the manner above described permits free selection of bogie wheel sizes. Thus, any size bogie wheel can be used and different sizes can be used at different corners of the track configuration. However, it should be remembered that the bogie wheel sizes must be determined prior to the calculations which result in the determination of link lengths and the angle $\alpha$.

In addition, a track suspension assembly 41 arranged in the manner above described is not limited to a four corner system as shown, for example, in FIG. 3. More specifically, the track suspension assembly of the invention is equally usable in a three corner system (See FIG. 9) where the fixed upper rear bogie 33 is eliminated. In addition, the parallelogram linkage or track suspension assembly of the invention is usable with a suspension system having more than four bogies arranged in a four corner pattern. For instance, the arrangement shown in FIG. 10 can be employed, which arrangement employs upper intermediate bogies 151 rotatably mounted on an axis fixed relative to the chassis 15 and the lower intermediate bogies 153 rotatably mounted on an axis fixed relative to the carriage 47.

In operation, upon forceful engagement with the ground, the carriage 47 swings rearwardly and upwardly along a path defined by the parallel links 77 and 79, which path provides for substantially uniform tension in the belt 43. Upward movement and rearward movement of the carriage 47 is yieldably resisted by the springs 91 which offer initially increasing resistance followed by decreasing resistance. In addition, the shock absorbers 103 serve to dissipate energy both during movement from the normal running position and during return movement to the normal running position.

The simultaneous rearward and upward movement of the carriage 47 occurring consequent to violent engagement with the ground, serves, in effect, to thrust the chassis 15 forwardly and thereby to maintain forward chassis momentum, notwithstanding momentary or temporary interruption in the forward movement of the carriage 47 and track 43. Such relative movement between the chassis 15 on the track 43 and the resulting continued forward movement of the chassis 15 diminishes the possibility of the operator being thrown from the vehicle.

Various of the features of the invention are set forth in the following claims.

What is claimed is:

1. A snowmobile comprising a chassis, a drive sprocket rotatably mounted on said chassis, a movable track supporting carriage including forward and rearward track supporting bogies mounted on said carriage for rotation about axes fixed relative to said carriage adjacent the forward and rearward ends of said carriage and with said track trained thereabout, a track having a fixed length and trained around said drive sprocket and said forward and rearward bogies, and means for mounting said carriage to said chassis for movement between an extended position, a retracted position, and an intermediate position, said extended position being spaced from said chassis at a first distance and locating said forward and rearward bogies to define a first track path having a length equal to said track length, said retracted position being located rearwardly of said extended position and spaced from said chassis at a second distance less than said first distance and locating said forward and rearward bogies to define a second track path having a length equal to said track length, said intermediate position being intermediate said extended and retracted positions and locating said forward and rearward bogies to define a third track path having a length equal to said track length, said carriage mounting means including forwardly and rearwardly spaced rigid links pivotally connected to said carriage about axes fixed relative to said carriage and extending in parallel relation to each other upwardly and forwardly from said carriage, each of said links also being pivotally connected to said chassis and said rearward link being dimensioned such that the distance between the pivotal connections of said rearward link to said chassis and to said carriage is substantially constant and substantially equal to the distance between the pivotal connections of said forward link to said carriage and to said chassis.

2. A snowmobile in accordance with claim 1 wherein said carriage mounting means includes means for limiting movement of said carriage in the direction away from said chassis to establish said running position.

3. A snowmobile in accordance with claim 1 including means connected between said carriage and said chassis for resiliently opposing movement of said carriage from said extended position.

4. A snowmobile in accordance with claim 1 including means connected between said carriage and said chassis for dissipating energy incident to carriage movement relative to said extended position.

5. A snowmobile in accordance with claim 4 wherein said energy dissipating means includes a pair of hydraulic shock absorbers.

6. A snowmobile comprising a chassis, a drive sprocket rotatably mounted on said chassis, a track trained, in part, around said drive sprocket, a track supporting frame including a carriage, track supporting bogies mounted on said carriage for rotation about fixed axes adjacent the forward and rearward ends of said carriage and with said track trained thereabout, and means for movably mounting said carriage to said chassis so as to afford movement between a running position spaced from said chassis and a retracted position rearwardly of said running position and closer to said chassis than said running position, said carriage mounting means including forwardly and rearwardly spaced rigid links pivotally connected to said carriage and extending in parallel relation to each other upwardly and forwardly from said carriage, each of said links also being pivotally connected to said chassis and said rearward link being formed such that the distance between the pivotal connections of said rearward link to said chassis and to said carriage is substantially constant and substantially equal to the distance between the pivotal connections of said forward link to said carriage and to said chassis, a compression spring, and means mounting said spring between said carriage and said chassis for increasing and then decreasing the resisting torque created by spring compression occurring consequent to carriage movement from said running position.

7. A track vehicle comprising a chassis, a drive sprocket supported by said chassis, a track trained, in part, around said drive sprocket, a carriage including forwardly and rearwardly spaced wheel means around which said track is also trained, means including forwardly and rearwardly spaced rigid links pivotally connecting said carriage to said chassis for swinging movement of said carriage relative to said chassis, said links each extending upwardly and forwardly from said carriage to said chassis and said links being formed such that the distance between the pivotal connections of said rearward link to said chassis and to said carriage is substantially constant and substantially equal to the distance between the pivotal connections of said forward link to said carriage and to said chassis, and means for limiting swinging movement of one of said links above said carriage in the direction from the forward end of said carriage to the rearward end thereof to establish a normal running position of maximum spacing of said carriage from said chassis.

8. A track vehicle in accordance with claim 7 and further including means for limiting swinging movement of said carriage relative to said chassis to establish a retracted carriage position rearwardly of said running position and closer to said chassis than said running position.

9. A track vehicle in accordance with claim 7 and further including means yieldably resisting carriage movement in the direction toward said chassis.

10. A track vehicle in accordance with claim 7 and further including means for dissipating energy in response to movement of said carriage relative to said chassis.

11. A track suspension assembly comprising a carriage having adjacent the forward and rearward ends thereof a plurality of bogie wheels rotatably mounted about axes fixed relative to said carriage, a pair of fowardly and rearwardly spaced rigid links pivotally connected to said carriage, each of said links including means located remotely from said carriage and adapted for pivotal connection to a snowmobile frame such that the distance between said pivotal connections of said links to said carriage and said means adapted for pivotal connection to a snowmobile frame is constant and is the same for both of said links, and means on said carriage limiting pivotal movement of at least one of the said links in the direction from the forward end of said carriage to the rearward end of said carriage.

12. A snowmobile comprising a chassis, a drive sprocket rotatably mounted on said chassis, a movable track supporting carriage including forward and rearward track supporting bogies mounted on said carriage for rotation about axes fixed relative to said carriage adjacent the forward and rearward ends of said carriage and with said track trained thereabout, a track trained around said drive sprocket and said forward and rearward bogies, and means pivotally mounting said carriage to said chassis for swinging movement between an extended position relatively spaced from said chassis and a retracted position relatively adjacent said chassis, said mounting means including spaced forward and rearward rigid links each pivotally connected to said carriage and extending in parallel relation upwardly and forwardly from said carriage and pivotally connected to said chassis, each of said links having the same length between the pivotal connections thereof to said chassis and said carriage, and means for limiting swinging movement of said carriage between said extended position and said retracted position, said carriage movement limiting means and said carriage mounting means being arranged so that the length of the path of travel of said track is substantially the same at said extended and retracted positions.

13. A snowmobile in accordance with claim 12 wherein said carriage movement limiting means and said carriage mounting means is arranged so that the length of the path of travel of said track is also substantially the same when said carriage is at a position intermediate said extended and retracted positions.

* * * * *